(12) United States Patent
Pajovic

(10) Patent No.: US 8,907,748 B2
(45) Date of Patent: Dec. 9, 2014

(54) COMMON-MODE SUPPRESSION FILTER FOR MICROSTRIP 10-GB/S DIFFERENTIAL LINES

(75) Inventor: Miroslav M. Pajovic, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 965 days.

(21) Appl. No.: 13/019,017

(22) Filed: Feb. 1, 2011

(65) Prior Publication Data
US 2012/0194291 A1 Aug. 2, 2012

(51) Int. Cl.
*H01P 1/20* (2006.01)
*H04B 3/28* (2006.01)

(52) U.S. Cl.
CPC ............... *H01P 1/2005* (2013.01); *H04B 3/28* (2013.01)
USPC .......................................... 333/202; 333/204

(58) Field of Classification Search
CPC .......... H03H 1/0007; H04B 3/28; H04B 3/30; H01P 1/213
USPC .................................... 333/12, 185, 204, 202
See application file for complete search history.

(56) References Cited

U.S. PATENT DOCUMENTS

2012/0032749 A1* 2/2012 Shiue et al. ................... 333/5
2013/0249652 A1* 9/2013 Pajovic ........................ 333/204

OTHER PUBLICATIONS

De Paulis et al., "Experimental Validation of Common-Mode Filtering Performances of Planar Electromagnetic Band-gap Structures", Jul. 25-30, 2010, IEEE, p. 764-769.*
De Paulis et al., "Common Mode Filtering Performances of Planar EBG Structures", 2009, IEEE, p. 86-90.*

* cited by examiner

*Primary Examiner* — Dean O Takaoka
*Assistant Examiner* — Alan Wong
(74) *Attorney, Agent, or Firm* — Meunier Carlin & Curfman, LLC

(57) ABSTRACT

Several implementations disclosed herein are directed to compact-size common-mode filters that are suitable for implementation in densely populated multilayered printed circuit boards (PCBs) with numerous I/O ports—as well as integrated circuit (IC) chips and I/O connectors—to suppress EMI emissions. Certain implementation are specifically directed to filters for four differential signal lines that carry 10-Gb/s digital signals. These implementations provide common-mode suppression within gigahertz frequencies where common-mode noise comprising 10-Gb/s signal is problematic, but without any significant degradation of differential-mode signals. Moreover, certain of these implementations are directed to compact-size filters that suppress common-mode signal noise at 10.3 GHz associated with the fundamental harmonic 10 Gb/s-signals of XFI and SFI. In other implementations, a combination of filters is presented to provide common-mode noise suppression at both the first harmonic frequency of 10.3 GHz as well as the second harmonic frequency of 20.6 GHz.

20 Claims, 8 Drawing Sheets

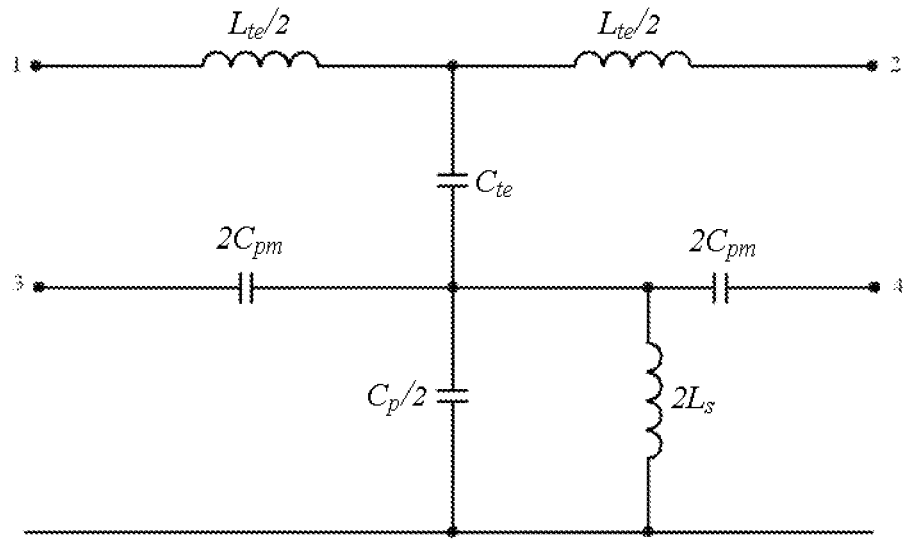
FIG. 4C
FIG. 5A
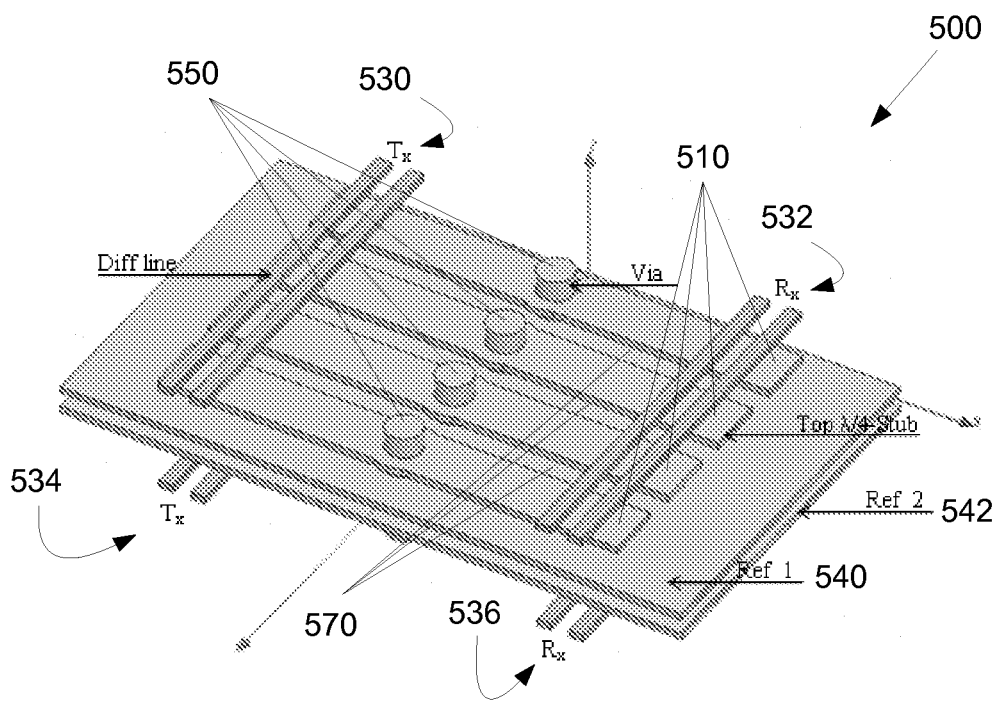

COMMON-MODE SUPPRESSION FILTER FOR MICROSTRIP 10-GB/S DIFFERENTIAL LINES

BACKGROUND

Differential signal lines can be used to achieve lower electromagnetic interference (EMI) emissions, better signal integrity (SI), and relatively better data quality for high-speed digital signals in high-speed network equipment. However, in addition to transporting the desired differential-mode signals, undesired common-mode noise can also propagate along differential signal lines, and conventional common-mode noise suppression filters—such as ferrite chokes, which work well in lower frequency ranges—have only limited effectiveness in the much higher gigahertz frequency ranges. Common-mode noise is particularly problematic at the specific gigahertz frequencies corresponding with the digital signal rates and harmonics of the system gigahertz-clock (specifically at 10.3125 GHz and 20.625 GHz).

Common-mode noise can originate in both input/output (I/O) differential buffers and printed circuit board (PCB) differential lines when, for example, differential signals are skewed in time and unbalanced in amplitude and rise-and-fall times. Furthermore, I/O ports and I/O cables may act as efficient slot and wire antennas, respectively, for common-mode noise. Consequently, it is important to suppress common-mode noise before it can reach I/O ports and I/O cables, but to do so without degrading the differential signals. Yet for implementations in densely populated PCBs with a high number of differential signal lines, the use of any single-differential filters may not be suitable since high-capacity 10-Gb/s network equipment may have hundreds of I/O differential signal lines that require common-mode suppression.

Some attempts have been made to achieve common-mode suppression in gigahertz frequency ranges using electromagnetic band-gap (EBG) techniques. In implementation, two general types of EBG structures are the "mushroom" and the "HIS." Typical mushroom structures utilize periodic EBG cells (or "patches") that are embedded into a multilayer PCB stackup between the power and ground reference planes to suppress common-mode noise; however, the size of EBG structures used in densely populated PCBs is crucially important, and traditional mushroom-like EBG structure are generally too large. In contrast, typical high impedance surface (HIS) structures comprise a combination of narrow slots and inductive stripes that are embedded in the power or ground reference planes, but slots in the power or ground reference planes can have the undesirable effect of degrading signal and/or power integrity.

SUMMARY

Several implementations disclosed herein are directed to compact-size common-mode filters that are suitable for implementation in densely populated multilayered printed circuit boards (PCBs) with numerous I/O ports—as well as integrated circuit (IC) chips and I/O connectors—to suppress EMI emissions. Certain implementation are specifically directed to filters for four differential signal lines that carry 10-Gb/s digital signals. These implementations provide common-mode suppression within gigahertz frequencies where common-mode noise comprising 10-Gb/s signal is problematic, but without any significant degradation of differential-mode signals. Moreover, certain of these implementations are directed to compact-size filters that suppress common-mode signal noise at 10.3 GHz associated with the fundamental harmonic 10 Gb/s-signals of XFI (10-Gb/s small form factor interface) and SFI (small form factor interface) chip-to-chip electrical interface specifications. In other implementations, a combination of filters is presented to provide common-mode noise suppression at both the first harmonic frequency of 10.3 GHz as well as the second harmonic frequency of 20.6 GHz.

Certain implementations herein disclosed are directed to a common-mode noise filter comprising a first EBG filter placed between a first reference plane and a first plurality of differential signal lines comprising at least two pairs of differential signal lines. Various other implementations herein disclosed are directed to a common-mode noise filter comprising at least one EBG cell, said EBG cell comprising a via pad comprising a through-hole; at least one stripe coupled to the via pad; at least one base coupled to the at least one stripe; and art least one quarter coupled each base. Yet other implementations herein disclosed are directed to a common-mode noise filter EBG cell itself.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings:

FIG. 4C is a even-mode circuit diagram for a 10-GHz EBG filter for a single differential pair;

FIG. 5A is a 3-D view of a 20-GHz EBG filter comprising eight 20-GHz EBG cells arranged in two planes exterior to the reference planes for suppressing second-harmonic common-mode noise for four pairs of differential lines in a multi-layer PCB;

DETAILED DESCRIPTION

Several implementations disclosed herein are directed to efficient common-mode noise stop-band filters having compact size suitable for implementation in PCBs with a larger number of 10-Gb/s input/output ports but requiring a height of no more than 0.2 mm (8 mils) per an upper or lower filter half on two planes exterior to the reference planes ("Ref 1" and "Ref 2"). As such, these implementations make it possible to use the board layers between the reference planes for other signal or power routings not related common-noise filtering (in contrast to the approach of other filter solutions). For several implementations disclosed herein, measurements and dimensions are given as variables for clarity and/or relative proportions (for example, "length a and width W"), and specific values are given later herein for certain subsets of these implementations.

In addition to implementation at multilayer PCBs, alternate implementations of the filters are suitable for implementation in a chip package with higher relative dielectric constants than those of FR-4 PCBs where the filters' dimensions are further reduced. For example, whereas the occupied x-y area by a PCB version of filter in certain implementation (where the PCB has a dielectric constant of 4) may be approximately 5 mm×3 mm (200 mil×120 mil) in size, implementation in a chip package with a dielectric constant of 8 could enable the filter size can be reduced to approximately 3 mm×2 mm (120 mil×80 mil).

Figure 1:
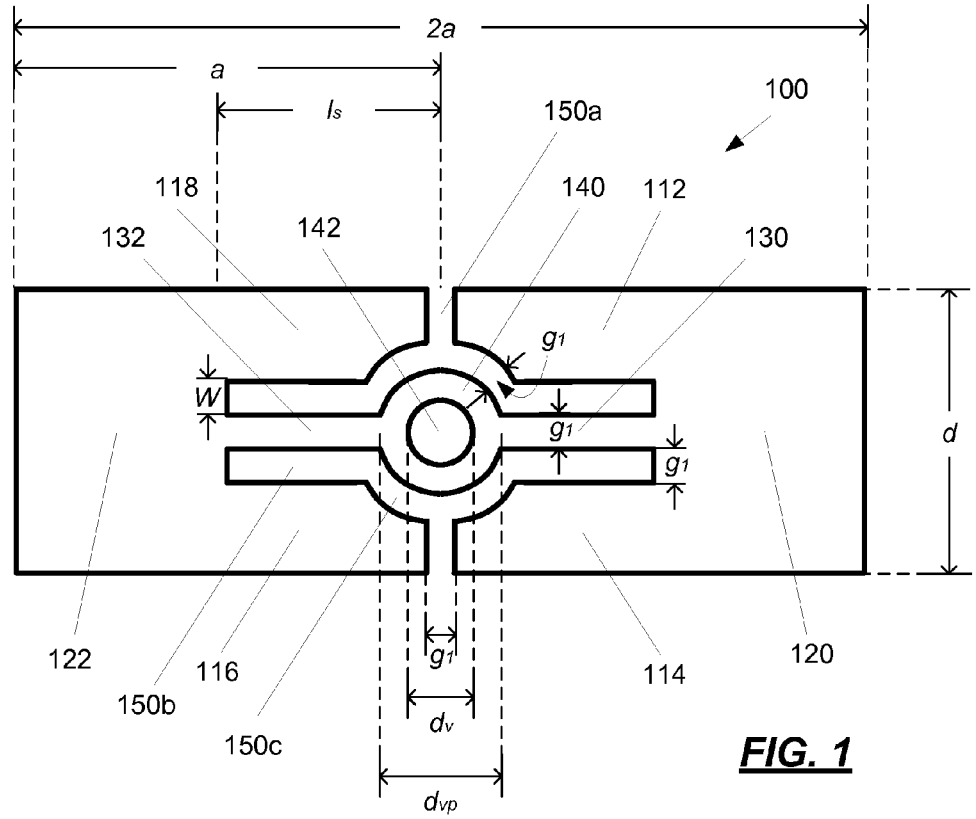
FIG. 1 is a top-view of a single 10-GHz EBG cell.

FIG. 1 is a top-view of a single 10-GHz EBG cell utilized by several implementations disclosed herein. Referring to FIG. 1, the 10-GHz EBG cell 100 comprises four quarters 112, 114, 116, and 118 connectively coupled and intending centrally from a pair of bases 120 and 122 (where each pair of quarters connected to a base together comprises a "stub"). The bases 120 and 122 (and the stubs of which they are a part) are connectively coupled to two inductive stripes 130 and 132 that, in turn, are connectively coupled to a donut-shaped via pad 140 comprising a central through-hole 142 for a via (not shown).

Except at the points where the via pad 140 is connected to a via (not shown) at the through-hole 142, the gaps between any two adjacent quarters (e.g., 150a), as well as between each quarter and an adjacent stripe (e.g., 150b) and between each quarter and the via pad (e.g., 150c), have a width of $g_1$. Moreover, the inductive stripes 130 and 132 each have a length of $l_s$ and a width of W such that the stripes—when grounded to a reference plane through a via (not shown) connectively coupled to the via pad 140 through the through-hole 142—obtain enough inductance to reach the desired 10-GHz resonance. The EBG cell 100 has an overall length of 2a and a width of d such that the EBG cell 100 is electrically short at the 10-GHz range, that is, $d \ll \lambda_{10G}$. The diameter of the via through-hole 142 is $d_v$ and the diameter of the via pad 140 is $d_{vp}$. These specific dimensions for each of these measures depends upon the relative dielectric constant ($\in_r$) and loss tangent of the material from which the EGC cell is comprised.

Figure 2:
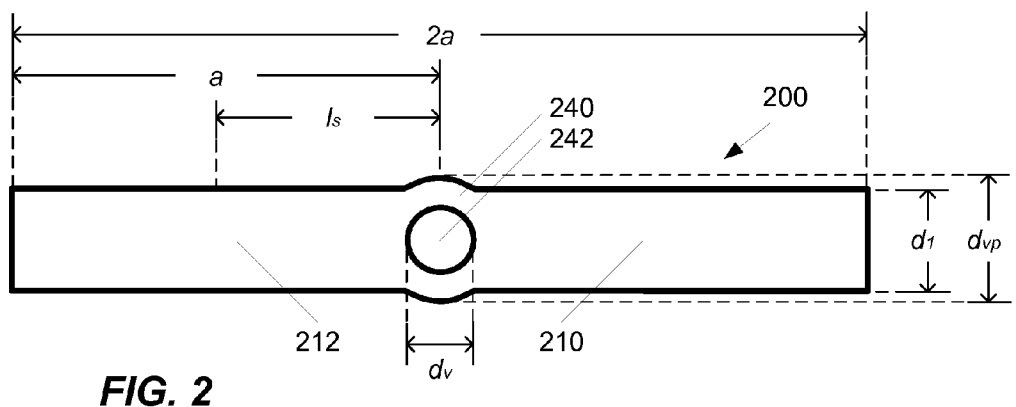
FIG. 2 is a top-view of a single ¼-wavelength 20-GHz EBG cell.

FIG. 2 is a top-view of a single ¼-wavelength 20-GHz EBG cell utilized by several implementations disclosed herein. Referring to FIG. 2, the 20-GHz EBG cell 200 comprises two stubs 210 and 212 connectively coupled and extending centrally from an embedded via pad 240 comprising a central through-hole 242 for a via (not shown).

The 20-GHz EBG cell has a stub length a that is end-shorted by the via to the reference plane so that it acts as ¼-wavelength stub at 20 GHz, that is, $a \approx ¼\lambda_{20G}$. The diameter of the via through-hole 242 is $d_v$ and the diameter of the embedded via pad 240 is $d_{vp}$. Again, these specific dimensions for each of these measures depends upon the relative dielectric constant ($\in_r$) and loss tangent of the material from which the EGC cell is comprised.

Figure 3A:
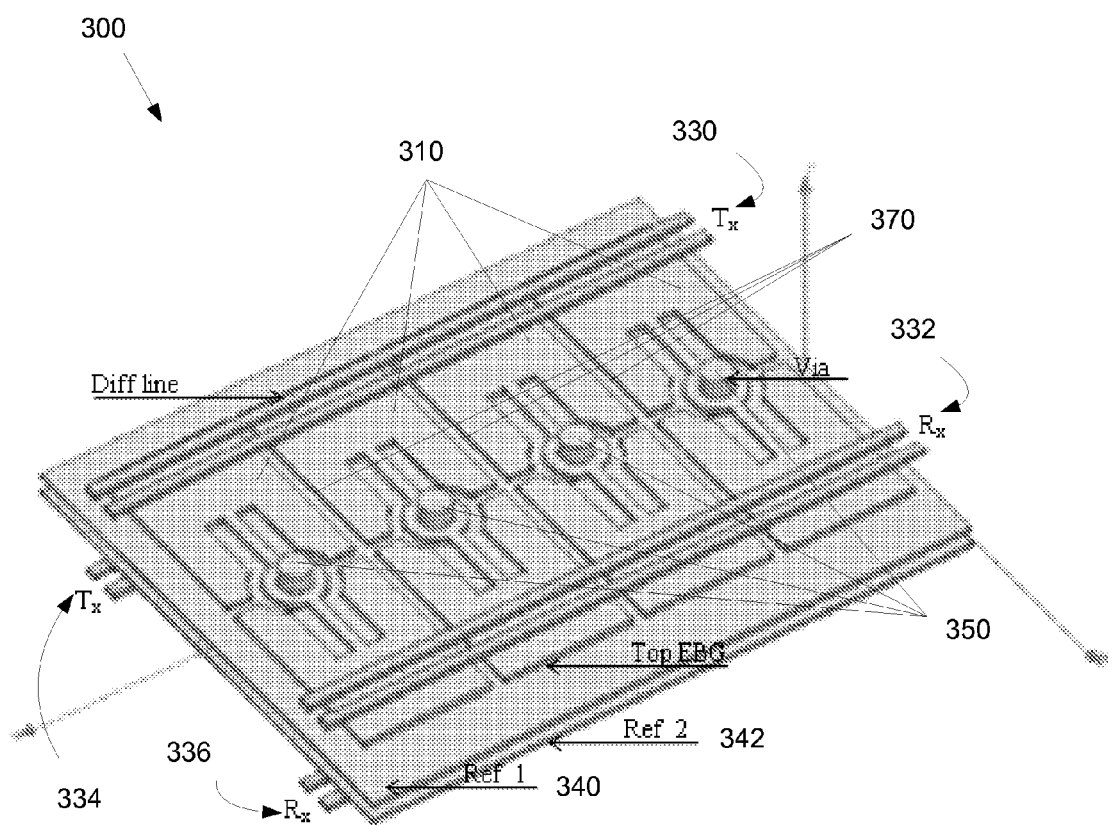
FIG. 3A is a 3-D view of a 10-GHz EBG filter comprising eight 10-GHz EBG cells arranged in two planes exterior to the reference planes for suppressing first-harmonic common-mode noise for four pairs of differential lines in a multi-layer PCB.
Figure 3B:
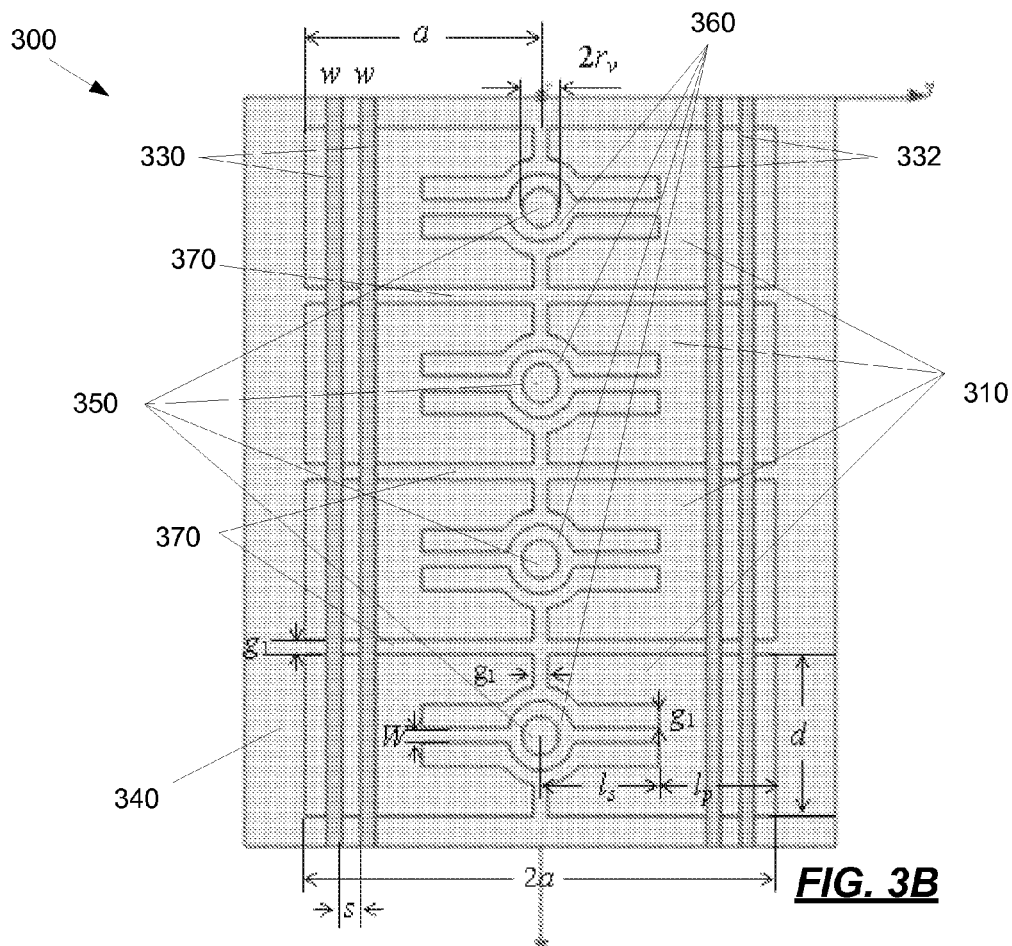
FIG. 3B is a top view of a 10-GHz EBG filter comprising eight 10-GHz EBG cells arranged in two planes exterior to the reference planes for suppressing first-harmonic common-mode noise for four pairs of differential lines in a multi-layer PCB.
Figure 3C:
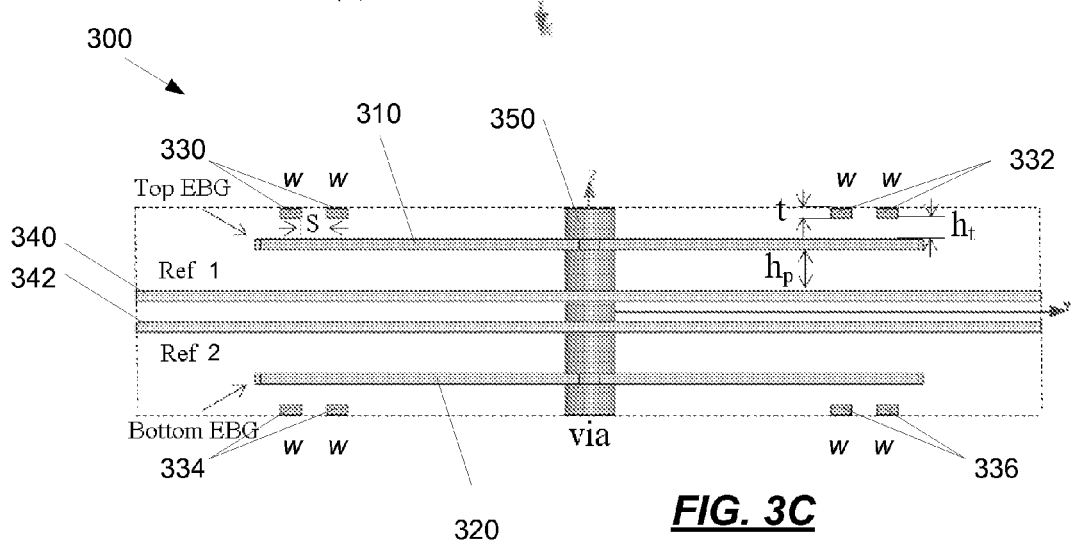
FIG. 3C is a stack-up view of a 10-GHz EBG filter comprising eight 10-GHz EBG cells arranged in two planes exterior to the reference planes for suppressing first-harmonic common-mode noise for four pairs of differential lines in a multi-layer PCB.

FIGS. 3A, 3B, and 3C are a 3-D view, a top view, and a stack-up view, respectively, of a 10-GHz EBG filter (comprising eight 10-GHz EBG cells arranged in two planes exterior to the reference planes) for suppressing first-harmonic common-mode noise for four pairs of differential lines in a multi-layer PCB. Referring to FIGS. 3A, 3B, and 3C, and for various implementations disclosed herein, the 10-GHz EBG filter 300 comprises four upper EBG cells 310 and four lower EBG cells 320 (all but the one cell seen in FIG. 3B being obstructed and unseen in all three views) embedded next to two upper pairs of differential lines 330 (TX (or $T_X$)) and 332 (RX (or $R_X$)) and two lower pairs of differential lines 334 (TX) and 336 (RX) (that is, where the upper components and lower components are said to be located opposite to each other). Each set of co-planar TX and RX differential lines (330 and 332, and 334 and 336) are spaced far enough apart from each other to avoid cross-talk between them; whereas the two pairs of TX differential lines 330 and 334, as well as the two pairs of RX differential lines 332 and 336, are isolated from each other by the reference ground planes, Ref 1 and Ref 2 (340 and 342 respectively).

In one embodiment, the four differential pairs 330, 332, 334, and 336 have trace width w and trace spacing s. The height of the differential traces above 392 (the view shown) or below 394 (the view hidden) their corresponding EBG cells is $h_t$ and the height of the EBG cells above or below their corresponding reference plane Ref 1 (340) or Ref 2 (342) is $h_p$. To suppress common-mode noise at the 10 GHz range, the 10-GHz EBG filter element comprising the four 10-GHz EBG cells (resonant at 10.3 GHz) is positioned between the differential pairs and the corresponding reference plane.

All of the EBG cells (e.g., 314 and 316) are connected to their respective reference planes by through-hole vias 350 of diameter $d_v$ where the diameter of each via 350 is $d_v$ and the diameter of each via pad 360 is $d_{vp}$, respectively. Except at the points where connected to the vias 360, the gaps 370 between two adjacent 10-GHz EBG cells is $g_1$.

Figure 4A:
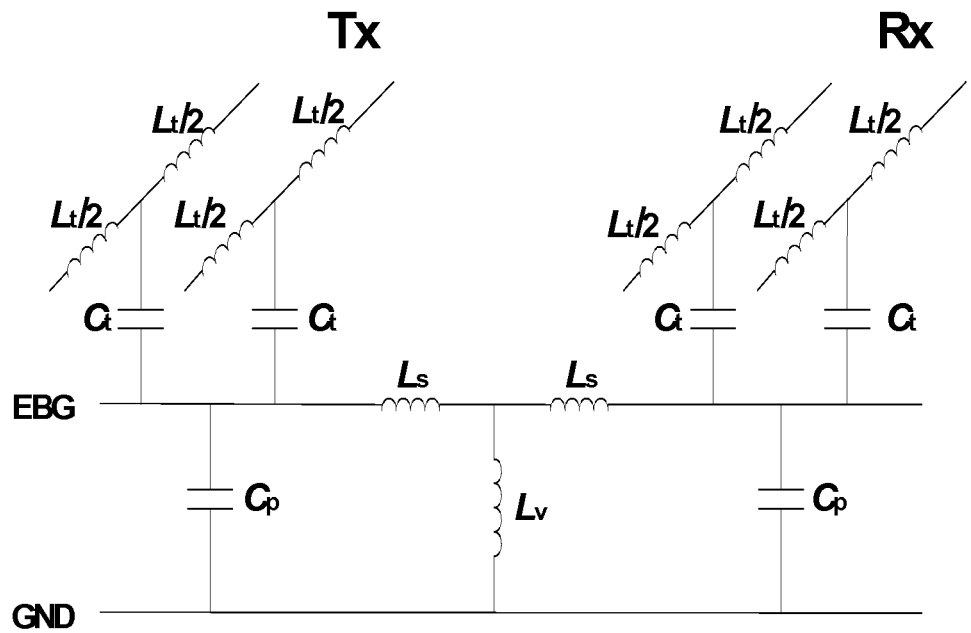
FIG. 4A is a first circuit diagram for a 10-GHz EBG filter for two pairs of differential lines.

When the EBG cell length a and width d are far smaller than the wavelength in the PCB dielectric at 10 GHz (i.e., d, a<<λg), a segment of two upper or lower differential lines next to an EBG cell can be presented by a lumped circuit as shown in FIG. 4A which illustrates a first circuit diagram for a 10-GHz EBG filter for two pairs of differential lines. Referring to FIG. 4A, the circuit elements $L_t$ and $C_t$ are the self-inductance and self-capacitance of one pair of differential traces with length d. Related to the inductive stripes embedded in EBG cells (230 and 232 of FIG. 2) and ground vias 350 of FIGS. 3A, 3B, and 3C), $L_s$ and $L_v$ denote the stripe inductance and via inductance, respectively. Also, $C_p$ denotes the self EBG capacitance to the corresponding reference plane.

Figure 4B:
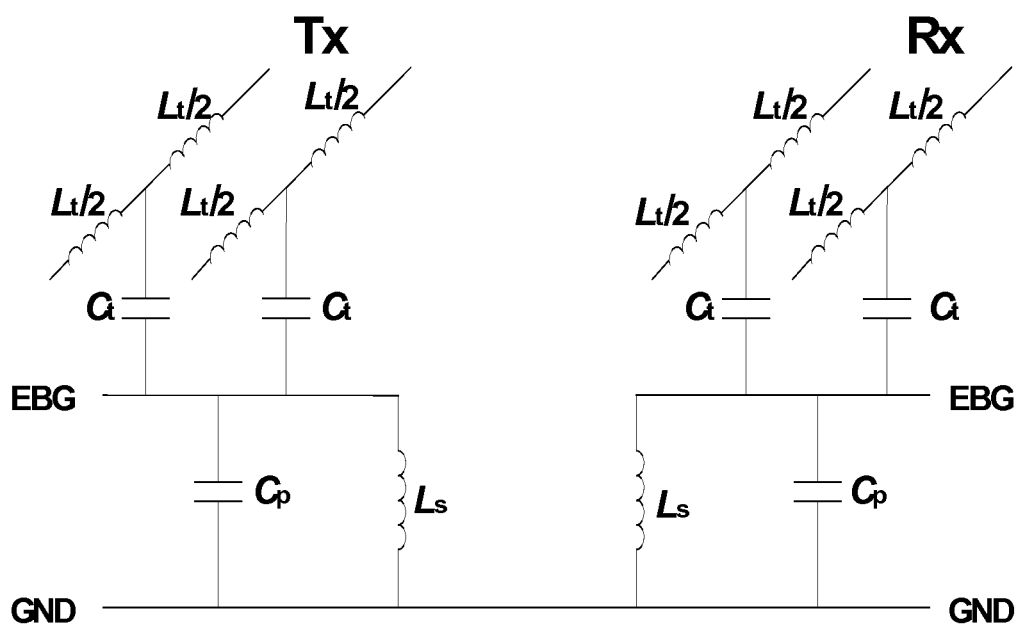
FIG. 4B is a second circuit diagram for a 10-GHz EBG filter for two pairs of differential lines.

Moreover, when the via inductance $L_v$ has a much lower value than the strip inductance $L_s$, the $L_v$ can be disregarded and $L_s$ can be treated as an electrical short to ground. Thus, the circuit in FIG. 4A can be split into two separate circuits related to either a TX differential line or a RX differential line, as shown in FIG. 4B. Moreover an even-mode circuit model for a TX or RX differential line with length of d is shown in FIG. 4C. Referring to FIG. 4C, the elements $L_{te}$ and $C_{te}$ are the even-mode inductance and even-mode capacitance of the differential line above a single EBG cell, and $C_{pm}$ is the mutual capacitance between adjacent EBG cells. In this figure, $L_{te}$ and $C_{te}$ are the even-mode inductance and even-mode capacitance of a differential trace, respectively. $L_s$ and $C_p$ are the inductance of the inductive stripe and parallel-plate capacitance between an EBG cell and the associated reference plane, respectively. $C_{pm}$ is the mutual capacitance between two adjacent EBG cells. $G_p$ and $R_s$ are the conductance of the board dielectric (representing losses of the dielectric) and resistance of EBG copper (representing losses of the copper), respectively.

Figure 5B:
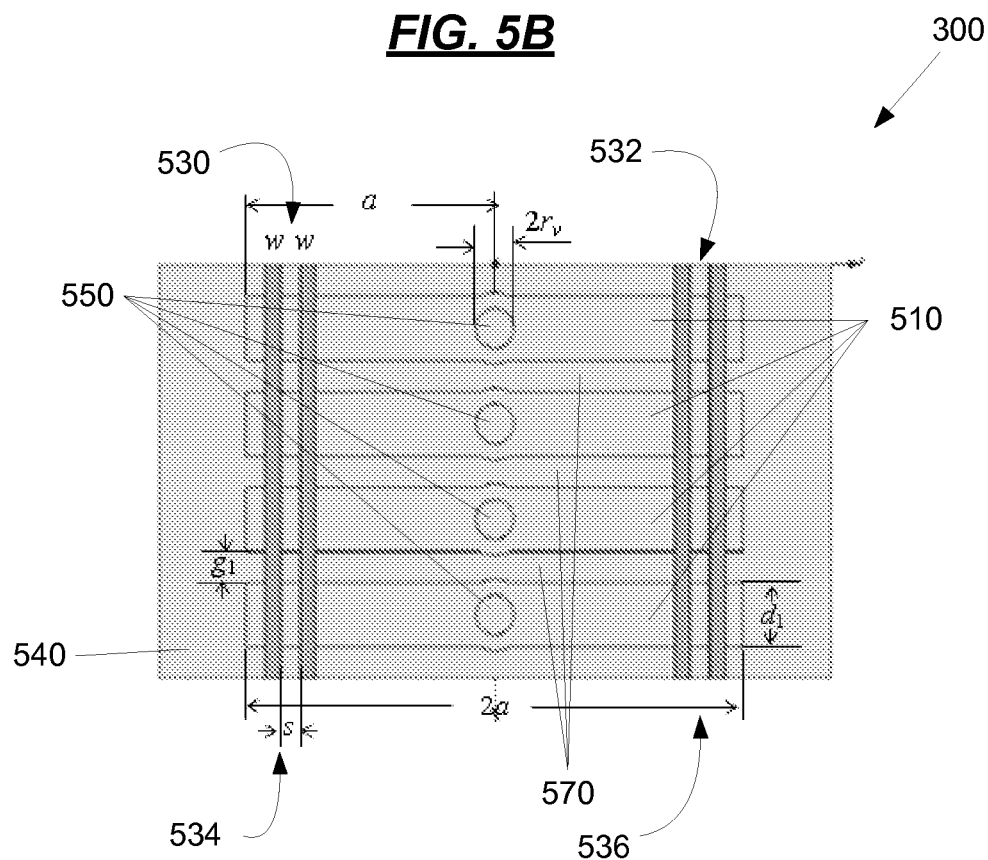
FIG. 5B is a top view of a 20-GHz EBG filter comprising eight 20-GHz EBG cells arranged in two planes exterior to the reference planes for suppressing second-harmonic common-mode noise for four pairs of differential lines in a multi-layer PCB.

In addition to the first harmonic (at 10.3 GHz), common-mode noise at a second harmonic (20.6 GHz) can also be significant for 10-Gb/s signal. Consequently, certain implementations are directed to providing a periodic common-mode filter for suppression of this harmonic. Specifically, FIGS. 5A and 5B illustrate a 3-D view and a top view, respectively, of a 20-GHz EBG filter (comprising eight 20-GHz EBG cells arranged in two planes exterior to the reference planes) for suppressing second-harmonic common-mode noise for four pairs of differential lines in a multi-layer PCB. (A corresponding 3-D stack-up view would be equivalent to the stack-up view provided in FIG. 3C.)

Referring to FIGS. 5A and 5B, and for various implementations disclosed herein, the 20-GHz EBG filter 500 comprises four upper 20-GHz EBG cells 510 and four lower 20-GHz EBG cells (obstructed and unseen in both views) embedded next to two upper pairs of differential lines 530 (TX) and 532 (RX) and two lower pairs of differential lines 534 (TX) and 536 (RX) (that is, where the upper components and lower components are said to be located opposite to each other). Each set of co-planar TX and RX differential lines (530 and 532, and 534 and 536) are spaced far enough apart from each other to avoid cross-talk between them; whereas the two pairs of TX differential lines 530 and 534, as well as the two pairs of RX differential lines 532 and 536, are isolated from each other by the reference ground planes, Ref 1 and Ref 2 (540 and 542 respectively).

In one embodiment, the four differential pairs 530, 532, 534, and 536 have trace width w and trace spacing s. The height of the differential traces above or below their corresponding 20-GHz EBG cells is $h_t$ and the height of the 20-GHz EBG cells above or below their corresponding reference plane Ref 1 (540) or Ref 2 (542) is $h_p$. To suppress common-mode noise at the 20 GHz range, the 20-GHz EBG filter element comprising the four 20-GHz EBG cells (resonant at 20.6 GHz) is positioned between the differential pairs and the corresponding reference plane.

All of the 20-GHz EBG cells (e.g., 514 and 516) are connected to their respective reference planes by through-hole vias 550 of diameter $d_v$ (or $2r_v$) where the diameter of each via 550 is also $d_v$. The gaps 570 between two adjacent 20-GHz EBG cells is a width of $g_2$. The length of a 20-GHz EBG cell is given as a and width is given as $d_1$ where $d_1$ is electrically short in terms of 20 GHz ($d_1 << \lambda_{20G}$).

Figure 6:
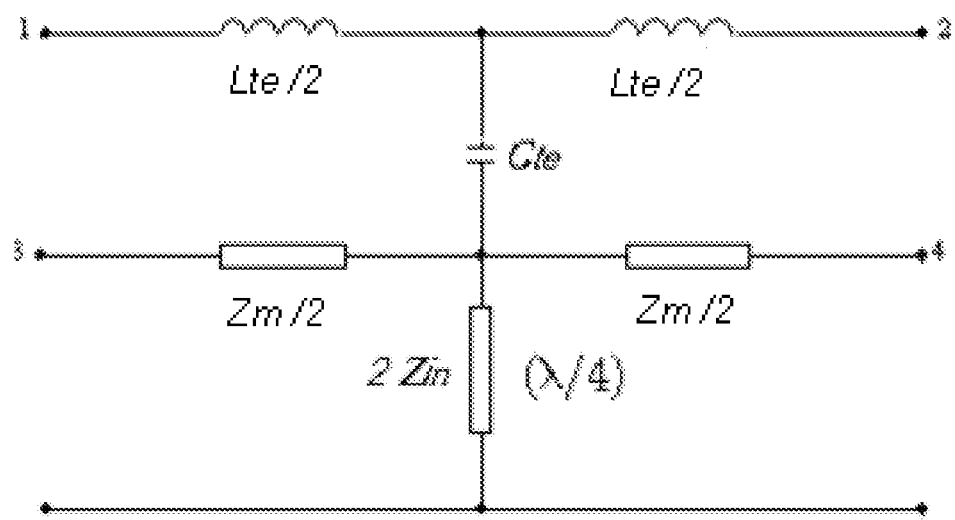
FIG. 6 is circuit diagram for a 20-GHz EBG filter for two pairs of differential lines.

When the stub length a of the 20-GHz EBG cells is not much smaller than the wavelength λg at 20 GHz, the 20 GHz EBG cells do not function as a lumped circuit but, instead, are better represented as a distributed circuit as shown in FIG. 6. Referring to FIG. 6, the 20-GHz EBG cell has a stub length a that is end-shorted by the via to the reference plane so that it acts as ¼-wavelength stub at 20 GHz, that is, $a \approx \frac{1}{4}\lambda_{20G}$. As such, the distributed impedance $Z_{in}$ and $Z_m$ are the input impedance of the ¼-wavelength stub of the 20-GHz filter and the mutual impedance between adjacent 20-GHz EBG cells, respectively.

In general, both the 10-GHz and 20-GHz equivalent circuit models contain a parallel $L_C$ resonant circuit formed by $L_s$ and $C_p$, which in turn suppresses common-mode noise that propagates along the differential pairs without negatively impacting the operating differential-mode transmissions.

Figure 7A:
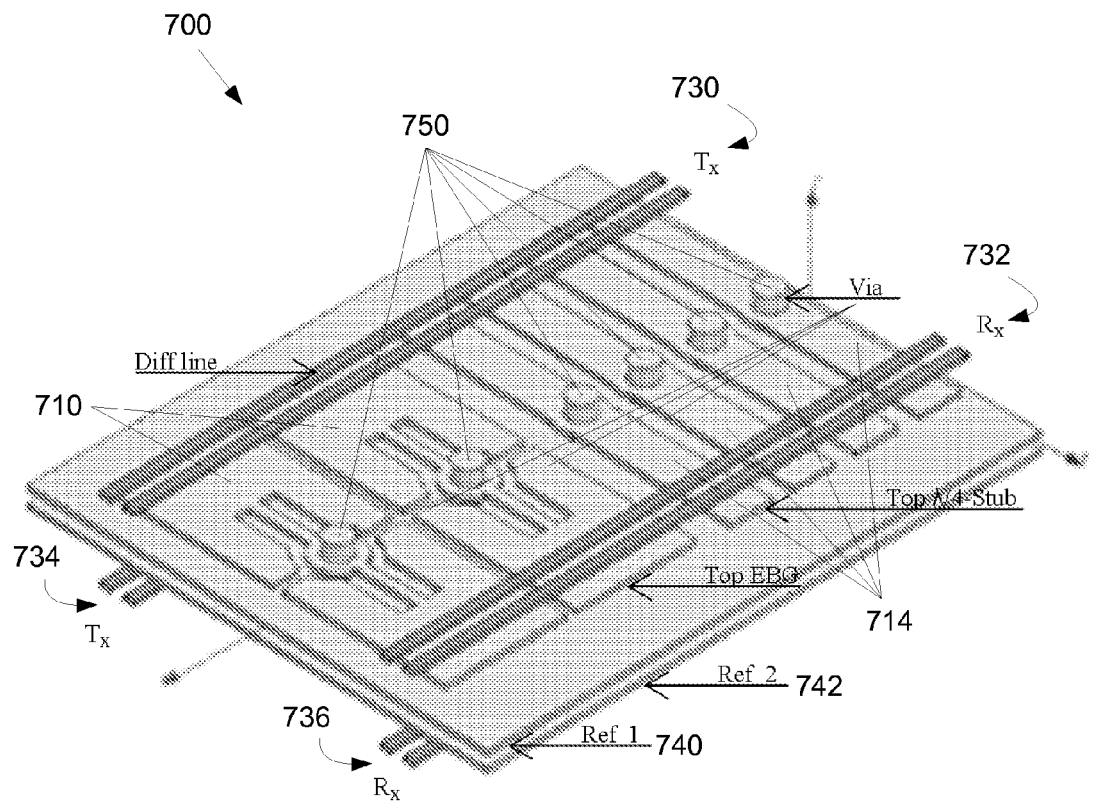
FIG. 7A is a 3-D view of a combined 10-GHz/20-GHz EBG filter comprising four 10-GHz EBG cells and eight 20-GHz EBG cells arranged in two planes exterior to the reference planes for suppressing both first—and second-harmonic common-mode noise for four pairs of differential lines in a multi-layer PCB.
Figures 7B, 7C:
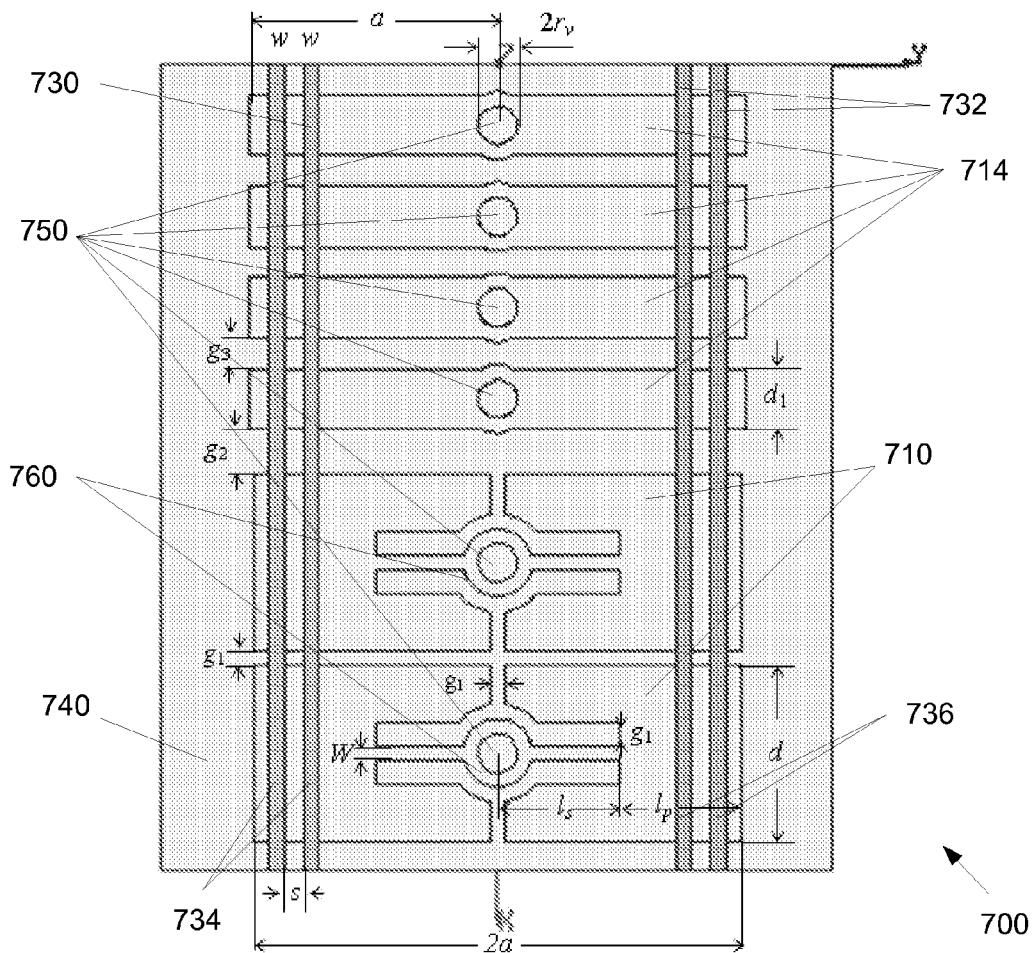
FIG. 7B is a top view of a combined 10-GHz/20-GHz EBG filter comprising four 10-GHz EBG cells and eight 20-GHz EBG cells arranged in two planes exterior to the reference planes for suppressing both first- and second-harmonic common-mode noise for four pairs of differential lines in a multi-layer PCB.
FIG. 7C is a stack-up view of a combined 10-GHz/20-GHz EBG filter comprising four 10-GHz EBG cells and eight 20-GHz EBG cells arranged in two planes exterior to the reference planes for suppressing both first- and second-harmonic common-mode noise for four pairs of differential lines in a multi-layer PCB.

Certain alternative implementations for a combined 10-GHz/20-GHz filter are also herein disclosed. FIGS. 7A, 7B, and 7C are a 3-D view, a top view, and a stack-up view, respectively, of a combined 10-GHz/20-GHz EBG filter (comprising four 10-GHz EBG cells and eight 20-GHz EBG cells arranged in two planes exterior to the reference planes) for suppressing both first- and second-harmonic common-mode noise for four pairs of differential lines in a multi-layer PCB. Referring to FIGS. 7A, 7B, and 7C, and for various implementations disclosed herein, the 10-GHz EBG filter 700 comprises two upper 10-GHz EBG cells 710 and two lower 10-GHz EBG cells 712 (all but the one cell seen in FIG. 7B being obstructed and unseen in the three views), as well as four upper 20-GHz EBG cells 714 and four lower 20-GHz EBG cells 716 (obstructed and unseen in all views), embedded next to two upper pairs of differential lines 730 (TX) and 732 (RX) and two lower pairs of differential lines 734 (TX) and 736 (RX) (that is, where the upper components and lower components are said to be located opposite to each other). Each set of co-planar TX and RX differential lines (730 and 732, and 734 and 736) are spaced far enough apart from each other to avoid cross-talk between them; whereas the two pairs of TX differential lines 730 and 734, as well as the two pairs of RX differential lines 732 and 736, are isolated from each other by the reference ground planes, Ref 1 and Ref 2 (740 and 742 respectively).

In one embodiment, the four differential pairs 730, 732, 734, and 736 have trace width w and trace spacing s. The height of the differential traces above or below their corresponding EBG cells is $h_t$ and the height of the EBG cells above or below their corresponding reference plane Ref 1 (740) or Ref 2 (742) is $h_p$. To suppress common-mode noise at both the 10 GHz and 20 GHz ranges, the 10-GHz and 20-GHz EBG filter elements comprising the two 10-GHz EBG cells (resonant at 10.3 GHz) and the four 20-GHz EBG cells (resonant at 20.6 GHz) are positioned between the differential pairs and the corresponding reference plane. All of the EBG cells (e.g., 710, 712, 714 and 716) are connected to their respective reference planes by through-hole vias 750 of diameter $d_v$ (or $2r_v$) where the diameter of each via 750 is $d_v$ and, for the 10-GHz EBG cells, the diameter of each via pad 760 is $d_{vp}$. Except at the points where connected to the vias, the gaps between two adjacent 10-GHz EBG cells (such as at 770) is $g_1$; the gaps between the 10-GHz EBG cells adjacent to the 20-GHz cells is $g_2$; and the gaps between two adjacent 20-GHz EBG cells is $g_3$.

The dimensions for each 10-GHz EBG cell stub is a by d and the dimensions for each 20-GHz EBG cell stub is a by $d_1$ (where each stub is end-shorted by the via to the reference plane). The 10-GHz EBG cells and the 20-GHz EBG cells operate as previously disclosed herein.

In certain implementations disclosed herein, the common-mode noise filter may be comprised of a material with relative dielectric constant $\in_r=4$ and loss tangent of 0.02, and where a 100-Ohm differential impedance and two stop-bands at the frequencies 10.3 GHz and 20.6 GHz are achieved, either alone or in combination, with the following filter dimensions: a=1.6 mm; d=1.2 mm; $d_1$=0.4 mm; w=0.1 mm; s=0.12 mm; $g_1$=0.1 mm; $g_2$=0.4 mm; $g_3$=0.2 mm; $h_f$=0.1 mm; $h_p$=0.1 mm; $d_v$=0.25 mm; $d_{vp}$=0.45 mm; $l_s$=0.8 mm; W=0.1 mm; and t=0.2 mm. The x-y area occupied by a board version of such a filter with these dimensions is approximately 5 mm×3 mm (200 mil×120 mil); however, an implementation in a chip package with a dielectric constant $\in_r=8$, the various dimensions could be reduced and the overall filter size could be reduced to approximately 3 mm×2 mm (120 mil×80 mil).

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A common-mode noise filter comprising:
    a first electromagnetic band-gap (EBG) filter placed between a first reference plane and a first plurality of differential signal lines comprising at least two pairs of differential signal lines; and
    at least two 10-GHz EBG cells and at least four 20-GHz EBG cells.

2. The common-mode noise filter of claim 1, further comprising:
    a second EBG filter placed between a second reference plane and a second plurality of differential signal lines comprising at least two pairs of differential signal lines, said second plurality of differential signal lines located opposite the first plurality of differential signal lines.

3. The common-mode noise filter of claim 1, wherein the common noise filter suppresses common-mode noise from at least four pairs of differential signal lines.

4. The common-mode noise filter of claim 3, wherein the common-mode noise filter is comprised of a material with a dielectric constant of four and having dimensions no greater than 5.0 mm by 3.0 mm.

5. The common-mode noise filter of claim 3, wherein the common-mode noise filter is comprised of a material with a dielectric constant of eight and having dimensions no greater than 3.0 mm by 2.0 mm.

6. The common-mode noise filter of claim 1, further comprising at least four 10-GHz EBG cells.

7. The common-mode noise filter of claim 1, further comprising at least four ¼-wavelength 20-GHz EBG cells.

8. The common-mode noise filter of claim 1, wherein the first plurality of differential lines is no more than 0.1 mm above or below the common-mode noise filter.

9. A common-mode noise filter comprising at least one EBG cell, said EBG cell comprising:
    a via pad comprising a through-hole;
    at least one stripe coupled to the via pad;
    at least one base coupled to the at least one stripe; and
    at least one quarter coupled to each base.

10. The common-mode noise filter of claim 9, wherein the at least one EBG cell comprises four upper 10-GHz EBG cells and four lower 10-GHz EBG cells.

11. The common-mode noise filter of claim 9, wherein the at least one EBG cell comprises:
    two upper 10-GHz EBG cells;
    two lower 10-GHz EBG cells;
    four upper ¼-wavelength 20-GHz EBG cells; and
    four lower ¼-wavelength 20-GHz EBG cells.

12. The common-mode noise filter of claim 11, wherein two adjacent 10-GHz EBG cells are separated by a gap g1 of no more than 0.1 mm.

13. The common-mode noise filter of claim 11, wherein two adjacent ¼-wavelength 20-GHz EBG cells are separated by a gap g3 of no more than 0.2 mm.

14. The common-mode noise filter of claim 11, wherein a 10-GHz EBG cell adjacent to a ¼-wavelength 20-GHz EBG cell are separated by a gap g2 of no more than 0.4 mm.

15. A common-mode noise filter EBG cell comprising:
    a via pad with a central through-hole;
    at least one stripe coupled to the via pad;
    at least one base coupled to the at least one stripe; and
    at least one quarter coupled to each base.

16. The common-mode noise filter EBG cell of claim 15, wherein the via pad has a diameter dvp of no more than 0.45 mm, and wherein the central through-hole has a diameter dv no greater than 0.25 mm.

17. The common-mode noise filter EBG cell of claim 15, wherein the at least one stripe has a width g1 no greater than 0.1 mm and a length ls no greater than 0.8 mm.

18. The common-mode noise filter EBG cell of claim 15, wherein the at least one quarter has a length ls no greater than 0.8 mm.

19. The common-mode noise filter EBG cell of claim 15, further comprising four quarters wherein each quarter is separated from each other quarter by a gap of no more than 0.1 mm.

20. The common-mode noise filter EBG cell of claim 19, wherein at least one quarter is separated from the at least one stripe by no more than 0.1 mm.

* * * * *